United States Patent [19]
Pötzsch

[11] Patent Number: 5,050,472
[45] Date of Patent: Sep. 24, 1991

[54] CONTOUR CUTTING MACHINE

[75] Inventor: Rolf Pötzsch, Freudenberg, Fed. Rep. of Germany

[73] Assignee: Albrecht Bäumer KG, Freudenberg, Fed. Rep. of Germany

[21] Appl. No.: 376,364

[22] Filed: Jul. 6, 1989

[30] Foreign Application Priority Data

Apr. 1, 1989 [EP] European Pat. Off. ........ 89105761.4

[51] Int. Cl.⁵ .................... B26D 1/10; B26D 1/48; B26D 1/54
[52] U.S. Cl. .................................. 83/424; 83/427; 83/428; 83/433; 83/785; 83/794
[58] Field of Search ............... 83/747, 757, 758, 778, 83/780, 781, 782, 786, 409, 412, 424, 427, 433, 788, 789, 794, 814, 418, 422, 428, 435.1; 125/21

[56] References Cited

U.S. PATENT DOCUMENTS

| 136,433 | 3/1873 | Grigg | 83/785 |
|---|---|---|---|
| 1,769,656 | 7/1930 | Sullenberger | 83/785 |
| 1,820,294 | 8/1931 | Anderson | 83/785 |
| 2,453,899 | 11/1948 | Gaines | 83/747 |
| 2,731,988 | 1/1956 | Steiner | 83/784 |
| 2,843,917 | 7/1958 | Crane et al. | 83/797 |
| 3,908,723 | 9/1975 | Hill | 83/747 |
| 4,222,299 | 9/1980 | Treffner et al. | 83/785 |
| 4,393,450 | 7/1983 | Jerard | 125/21 |
| 4,993,296 | 2/1991 | Nasu | 83/427 |
| 4,995,287 | 2/1991 | Nasu | 83/428 |

FOREIGN PATENT DOCUMENTS

| 2513560 | 4/1983 | France | 83/747 |
|---|---|---|---|
| 2082114 | 3/1982 | United Kingdom | 83/785 |

Primary Examiner—Hien H. Phan
Attorney, Agent, or Firm—Barnes, Kisselle, Raisch, Choate, Whittemore & Hulbert

[57] ABSTRACT

A contour cutting machine comprising a narrow band blade knife driven to oscillate in vertical or Z-direction, a cutting unit carrier having guides and driving means for guiding and driving first and second tool-carrying carriages horizontally in the direction of an Y-axis, and a table with divided plate for supporting and moving the workpiece horizontally in the direction of a X-axis, the table comprises first and second sliders for clamping the workpiece therebetween and moving same in the course of a cutting operation. The blade knife is rotatable about its longitudinal axis between the first and second tool carriages, to face in different directions of cut as required, and passes through a slot in the divided table plate. A hold-down means in the form of a sliding shoe may be provided to bear against the workpiece to prevent it from lifting away from the table plate.

11 Claims, 7 Drawing Sheets

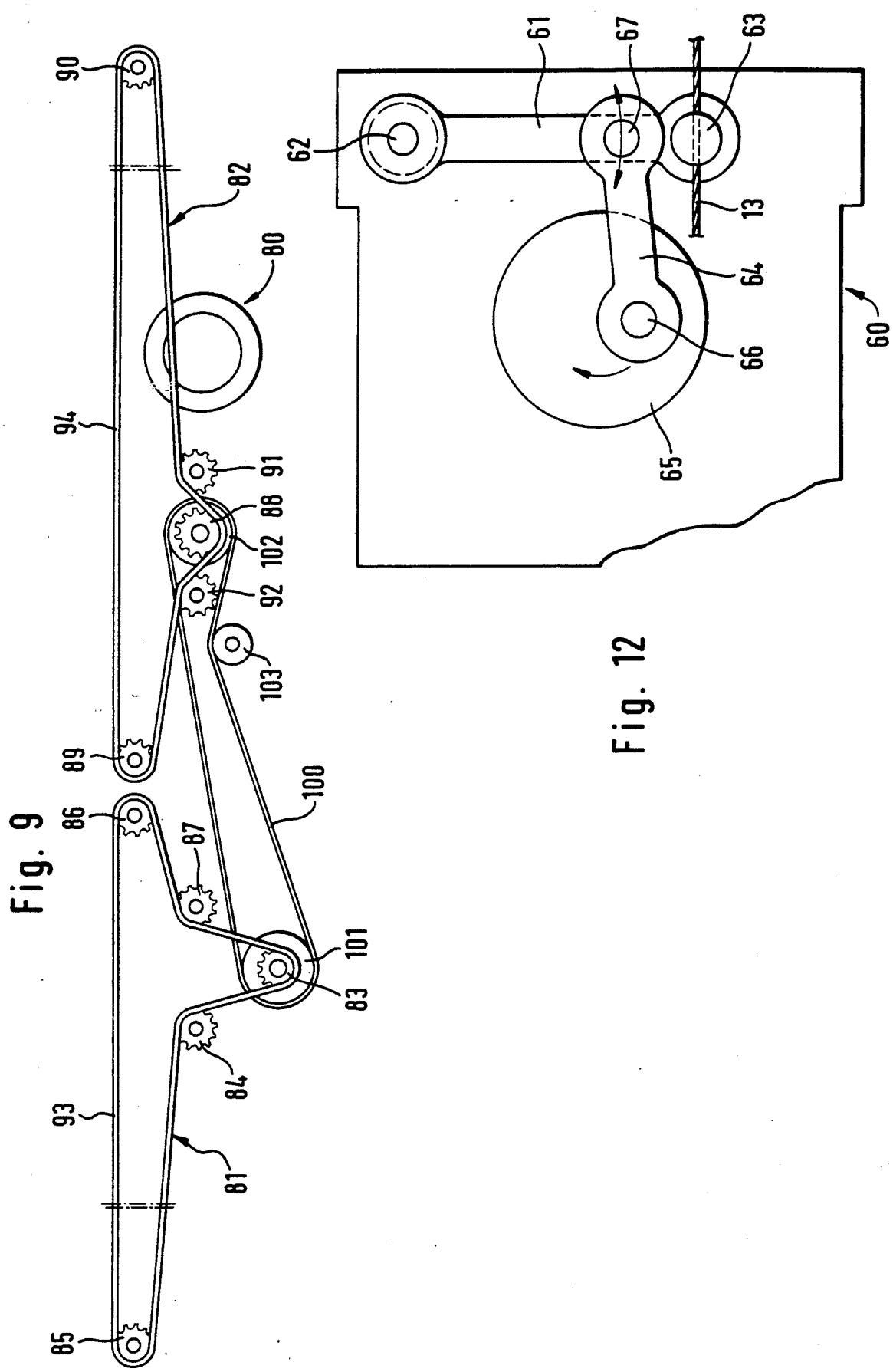

CONTOUR CUTTING MACHINE

BACKGROUND OF THE INVENTION

The present invention relates generally to a contour cutting machine, more particularly for cutting foam material in vertical direction.

A vertically cutting machine for cutting foam materials as disclosed in German patent specification no. 3,444,612 has a holder or cutting unit carrier which is of a generally C-shaped configuration. The mouth of the opening defined between the limbs of the C-shape is bridged across by a running-around cutting member in the form of a milling cutting wire or a heating wire, extending through a slot in a horizontal support surface of the workpiece table and producing a gap according to the thickness of the wire. The cutting wire can be displaced lengthwise in the slot so as to cut through material which is carried and supported on the surface of the workpiece table which comprises two separate feed elements for moving the workpiece transversely with respect to the direction of displacement of the cutting member in the slot, so that it is possible generally to cut curves or contours in the workpiece material such as foam from which shapes are to be cut. More specifically, the support surface of the workpiece table comprises two endless belts which are adjacent and so are forming a generally funnel-shaped slot. The belts can be driven in the same direction in order to move a workpiece supported thereon in one direction or the other, against the resistance of the cutting wire. Since the gap produced is a milled or melted gap between the cut pieces of material such cut pieces can move towards each other about the width of the gap. In addition, in operation of the machine, the endless belts which support the workpiece have a tendency occasionally to move laterally. Those two phenomena mean that the contours cut by the machine may be shifted from the location at which they are desired to be produced, thus giving rise to inaccurate cutting.

In addition, when dealing with samll foam pieces, there is the problem that the friction of the foam against the endless belts is too low relative to the necessary cutting pressure so that there is a danger of the foam material slipping, with the result that the curve which is cut in the foam material is defective. If the cutting wire pulls the foam piece which has been cut thereby towards the generally funnel-shaped slot between the two endless belts, that gives rise to the risk that the belt may pull the cut piece of foam material into the slot, thus also resulting in defective cutting. If on the other hand the wire is displaced in a direction such that the material to be cut is lifted away from the surface on which it is supported on the workpiece table, then it is no longer possible to achieve the necessary cutting pressure, transversely with respect to the workpiece, and it is then not possible to cut a curve.

A contour cutting machine as disclosed in German patent specification no. 3,313,133 provides that the cutting member is in the form of a horizontally extending and oscillating band blade knife and is of a length which only slightly exceeds the cutting region above the workpiece table. The band blade knife is gripped between two clamping devices which are rotatable by motor means to turn the knife according to the contour to be cut and which are simultaneously driven to oscillate the knife in its longitudinal direction. The clamping devices are located in a cutting unit carrier which can be moved up and down on the main frame structure of the machine and therefore also the knife. The workpiece can be moved in a horizontal direction by means of the workpiece table. It is thus possible to provide for relative displacement of the workpiece with respect to the knife along two axes. The knife is always turned so as to face in the desired direction of cut so that it is possible to cut curves or contours which f. i. appear on the vertical side surfaces of a foam block.

SUMMARY OF INVENTION

An object of the invention is to provide a contour cutting machine which is capable of cutting curves which appear in horizontal planes of the workpiece to be cut. Another object of the present invention is to provide a contour cutting machine adapted to produce clean accurate cuts in material such as foam.

Another object of the invention is to provide a contour cutting machine which operates with a high degree of reliability.

Still another object of the invention is to provide a contour cutting machine which affords a greater degree of versatility in operation thereof without involving major mechanical complexities.

In accordance with the present invention these and other objects are achieved by a contour cutting machine comprising first and second machine sections. The first main section includes a cutting unit carrier having first and second guide means which are arranged in mutually parallel superposed relationship, and upper and lower tool carriages of which the upper tool carriage is guided longitudinally along the upper guide means and the lower tool carriage is guided longitudinally along the lower guide means. Means are provided for driving the upper and lower tool carriages in the same direction and by the same distances. A narrow band blade or knife extends in a tensioned condition between the upper and lower tool carriages and is driven by a suitable means for actuating the blade. The first machine main section further includes a turning means for turning the blade, comprising first and second turning devices disposed at respective ones of the upper and lower tool carriages and adapted to turn the plane in which the blade cuts in accordance with the cutting operation to be performed thereby. The second machine main section includes a table structure having a divided table plate to provide a support surface for a workpiece, the table plate having a narrow gap therein for the blade to pass therethrough. First and second sliders are adapted to be moved towards each other, in relation to the support surface of the table plate, for clamping the workpiece between themselves on the table plate, while also being adapted to be moved jointly with each other on the table plate relative to the band blade for the cutting operation.

Because the gap through which the blade passes is defined between stationary table plate portions (not moving runs of a belt), it can be of a very narrow dimension and can be without a generally funnel-shaped entry, in order to prevent pieces of foam from penetrating thereinto. By virtue of the cutting member being in the form of a band blade, the gap produced in foam material is immediately closed behind the knife, and that not only eliminates the production of foam dust but also substantially avoids the risk of displacement of the cut piece of foam material. When the band blade or knife is driven with an oscillating movement, it can be of a particularly narrow configuration which means that the gap between the table plate portions, through which the blade passes, can also be particularly narrow, thereby substantially eliminating the risk of foam material being pulled into the gap. The gap between the table plate portions only has to afford sufficient space for the band blade to pass therethrough when being turned.

In order to prevent the foam material from lifting away from the support surface of the workpiece table plate when the blade is moved upwardly, the machine may also include, in a preferred feature, a sliding shoe or skid having a slot for a blade to pass therethrough. The sliding shoe or skid can thus bear against the material as it is being cut to carry the upwardly directed cutting force. The slot is formed in a rotatable member of the sliding shoe or skid and therefore follows the direction of cut of the blade.

In a preferred embodiment of the machine in accordance with the present invention the cutting unit carrier comprises first and second limb portions, namely a lower limb portion which is disposed beneath the table plate in the region of the gap between the divided portions thereof, and the upper limb portion which extends at a certain spacing above the table plate and which defines the maximum height of workpiece which can be cut with the machine. Guides for the above-mentioned upper and lower tool carriages extend lengthwise of the limb portions of the cutting unit carrier. In order for the tool carriages to be driven in the same direction and at the same speed, the machine may comprise a circulating, flexible drive member such as a toothed belt which extends with loop configurations along the guides, with the upper or lower run of the loop configurations being coupled to the respective associated tool carriage in order to drive same.

The band blade may be tensioned by means of a cable which is also guided in a loop-forming configuration.

In another preferred feature of the invention, for the purposes of driving the first and second sliders operable to clamp the workpiece therebetween, the machine may also include a respective circulating drive member for example in the form of a chain for driving each of the sliders. Each slider is coupled to the upper run of the respective chain associated therewith so that the chain can be driven in one direction or the other, in accordance with the length of the upper run thereof, in order to move the associated slider towards or away from the gap defined in the divided table plate. So that the two sliders with the material clamped therebetween can be driven synchronously for the cutting operation, the drives for the two chains are coupled together. That coupling can be released for the purposes of clamping the workpiece between the first and second sliders or for releasing the workpiece therefrom, so that one slider can be moved independently of the other.

Further objects, features and advantages of a machine according to the present invention will be more clearly apparent from the following description of a preferred embodiment thereof.

BRIEF DESCRIPTION OF THE DRAWINGS

FIG. 9 shows the drive of the table in the X-direction, FIG. 12 is a diagrammatic view of an oscillating drive arrangement.

DESCRIPTION OF THE PREFERRED EMBODIMENT

Figure 1:
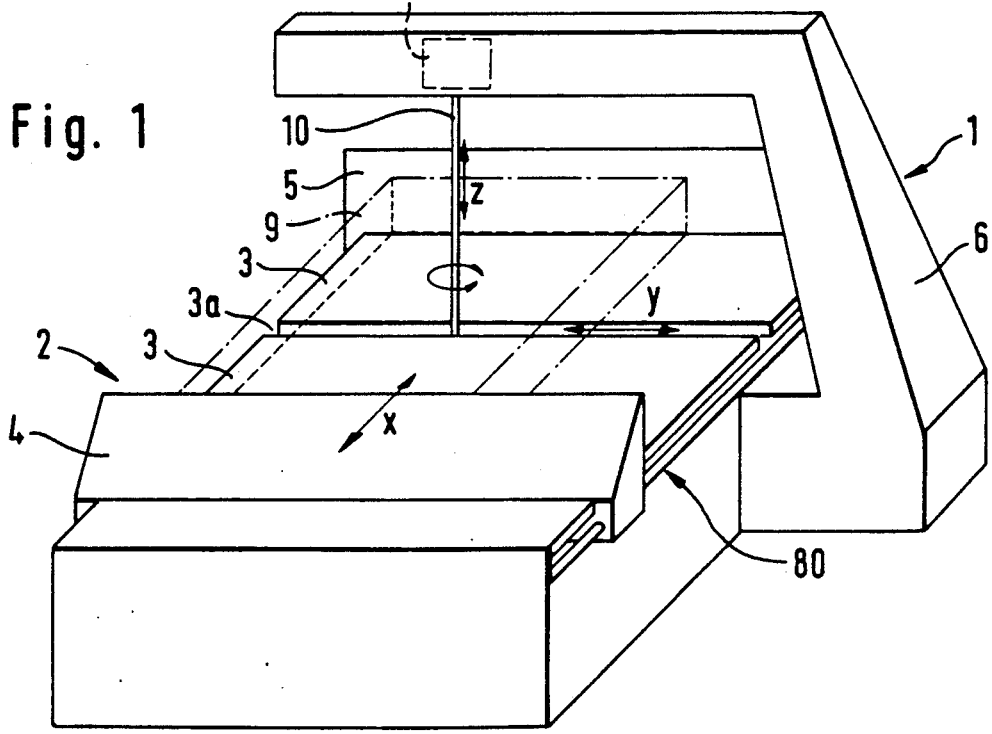
FIG. 1 is a general diagrammatic perspective view of the cutting machine according to the invention.

Referring firstly to FIG. 1, shown therein is a contour cutting machine which is designed to drive a narrow band blade or knife 10 and a workpiece 9 relative to each other in three directions X, Y and Z, with the—vertical—Z-direction coinciding with the longitudinal extent of the blade 10. The blade 10 is also rotatable about the Z-axis so that considered overall it is possible to cut curves in the—horizontal—XY-plane. There are two machine main sections, a first main section indicated generally at 1 for driving the blade 10 and a second main section indicated at 2 for driving the workpiece 9.

The second main section 2 which is in the form of a drive for producing movement in the direction of the X-axis has a divided table plate 3 which is fixed with respect to the remainder of the body structure of the machine and which defines a continuous, narrow slot or gap 3a which only slightly exceeds the width of the blade 10 and which extends in the Y-direction in FIG. 1. In addition, arranged above the table plate 3 are first and second sliders 4 and 5 which can be displaced relative to each other in order to clamp the workpiece 9 therebetween. The sliders 4 and 5 can also be moved jointly with each other in the X-direction, in which case they remain stationary relative to each other so as to maintain their set distance therebetween, thereby continuing to hold the workpiece 9 in position between them, while they move the workpiece 9 transversely with respect to the blade 10, as is required by the component of the contour cutting operation in the X-direction.

Figure 7:
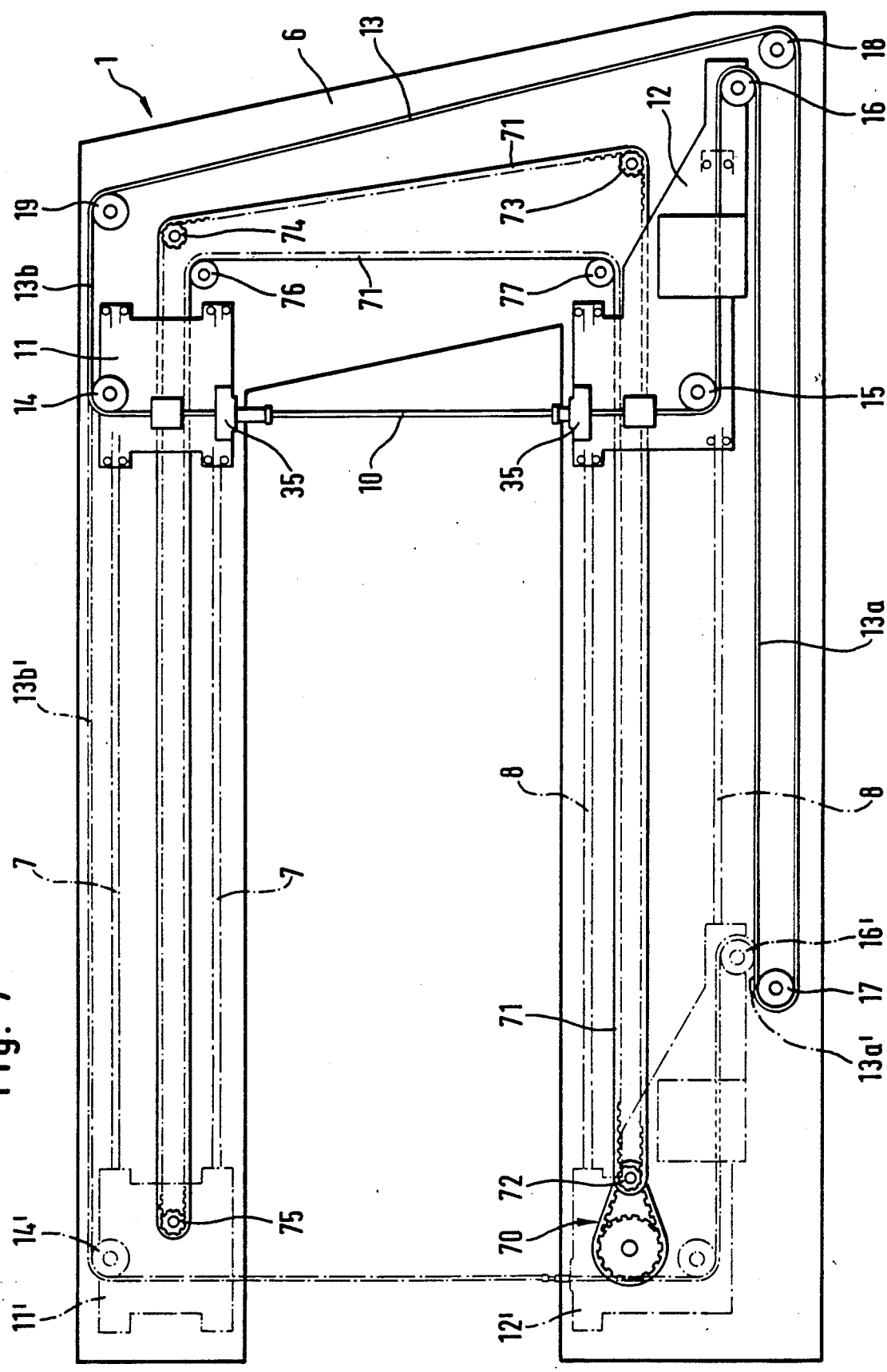
FIG. 7 shows the drive for the blade in the Y-direction.
Figure 8:
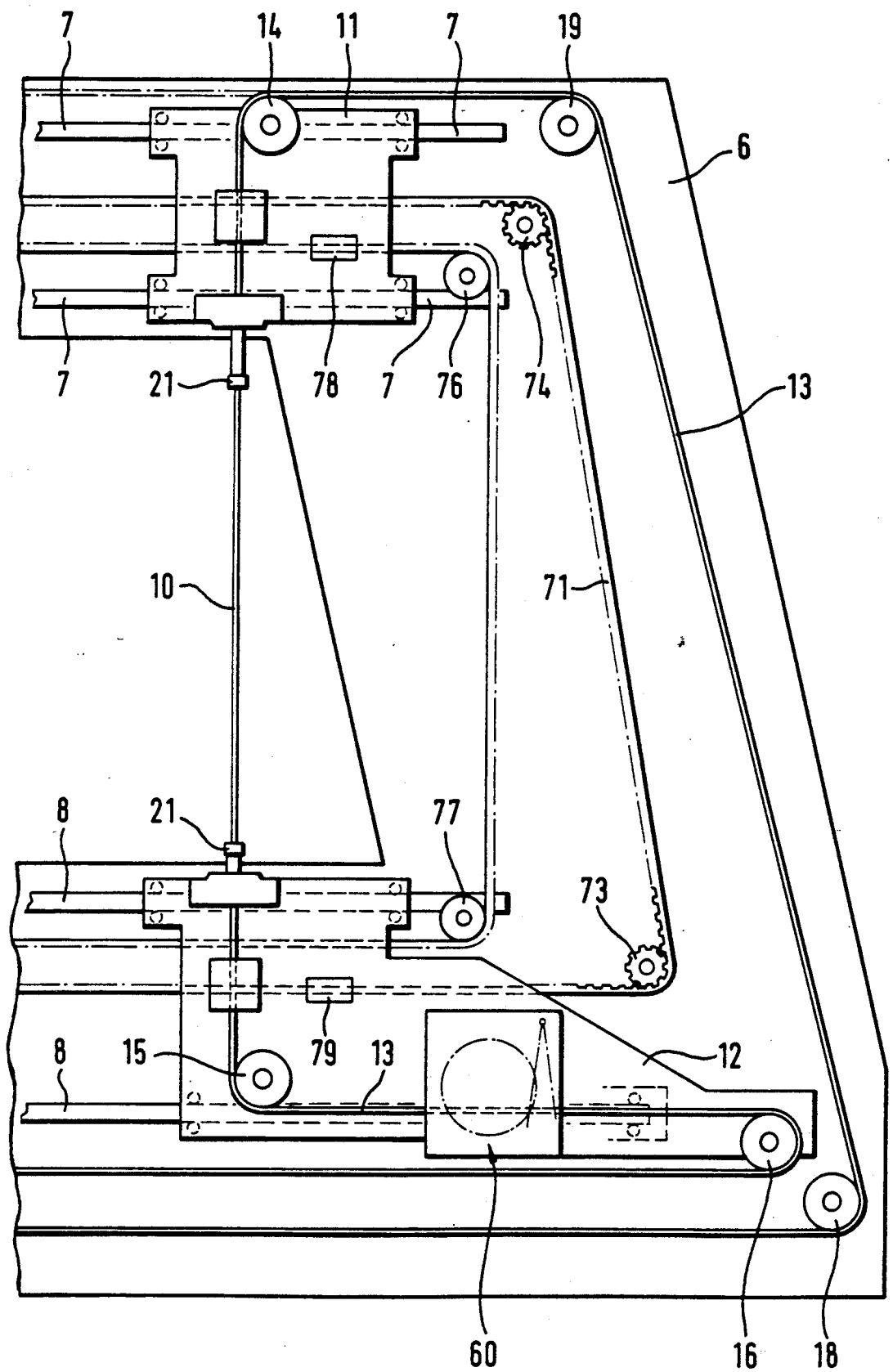
FIG. 8 is a view on an enlarged scale of a detail from FIG. 7.

The first main section 1 of the machine comprises a generally yoke-shaped cutting unit carrier as indicated generally at 6 in FIG. 1 and also illustrated in FIGS. 7 and 8. The carrier 6 includes horizontal guides 7 which are arranged above the table plate 3 and further horizontal guides 8 which are arranged beneath the table plate 3 so that the guides 7 and 8 extend in mutually parallel superposed relationship. The guides 7 and 8 are carried by the respective limb portions of the carrier 6. An upper tool carriage 11 is movable longitudinally of the guides 7 while a lower tool carriage 12 is movable longitudinally of the lower guides 8. The blade 10 constituting the cutting tool is disposed between the two carriages 11 and 12 and in operation of the machine moves lengthwise of the slot 3a defined in the table plate 3. In that situation it is held in a tensioned condition by means of a cable 13 which is passed around six cable pulleys 14 through 19 as can be most clearly seen from FIG. 7. The spindle carrying the pulley 14 is mounted on the tool carriage 11, the spindles of the pulleys 15 and 16 are mounted on the tool carriage 12 and the spindles of the pulleys 17, 18 and 19 are carried on the carrier 6. When the tool carriages 11 and 12 are displaced towards the left in FIG. 7 along their guides 7 and 8 in vertically superposed relationship and finally reach the positions indicated at 11' and 12', the pulleys 14 and 16 then occupy the positions indicated at 14' and 16'. As the spacing between the pulleys 16 and 17, as indicated at 13a in FIG. 7, decreases and becomes the spacing indicated at 13a', the spacing 13b between the pulleys 14 and 19 increases in proportion thereto and becomes the spacing indicated at 13b'. As the overall length of the loop configurations as represented by $13a + 13b = 13a' + 13b'$ of the cable 13 remains constant during displacement of the tool carriages 11 and 12, the blade tensioning effect is also maintained when the tool carriages 11 and 12 are displaced.

Figure 5:
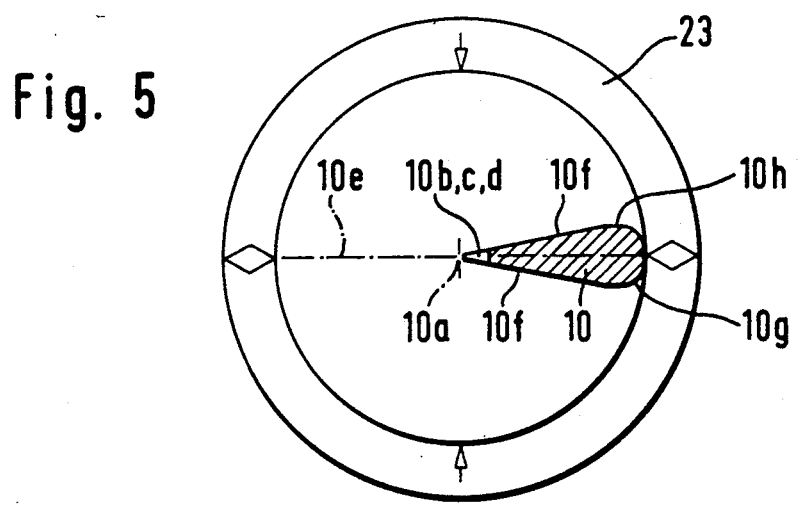
FIG. 5 is a view on a greatly enlarged scale and in cross-section through a band blade of the machine according to the invention.
Figure 6:
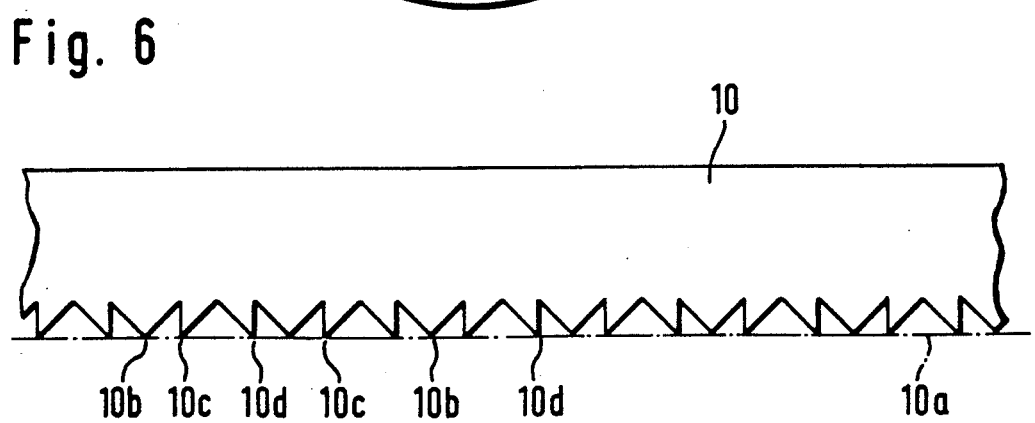
FIG. 6 is a greatly enlarged side view of a band blade of the machine of the invention.

The blade 10 is in the form of a narrow finite band and is of a length which only slightly exceeds the dimension of the cutting region above the table plate 3. As shown in FIGS. 5 and 6, the blade 10 is ground on both sides to form a cutting edge as indicated at 10a and may additionally be provided with closely spaced small teeth 10b, 10c and 10d which lie within a single cutting plane indicated at 10e in FIG. 5, that is to say they are not offset relative to each other. The width of the blade 10 is preferably from 1.5 to 3 mm. With a blade width of 2 mm, the ground length as indicated at 10f in FIG. 5 is about 1.5 mm. The back of the blade as indicated at 10g in FIG. 5 is rounded off. The thickness of the blade 10 is about 0.6 mm. The length of the blade is adapted to the width of the opening defined by the first and second horizontally extending limb portions of the cutting unit carrier 6 and is for example 700 mm.

It is possible to use an endless band blade which then follows the configuration adopted by the cable 13 in the illustrated embodiment, that is to say it is passed around the pulleys 14 through 19.

Figure 2:
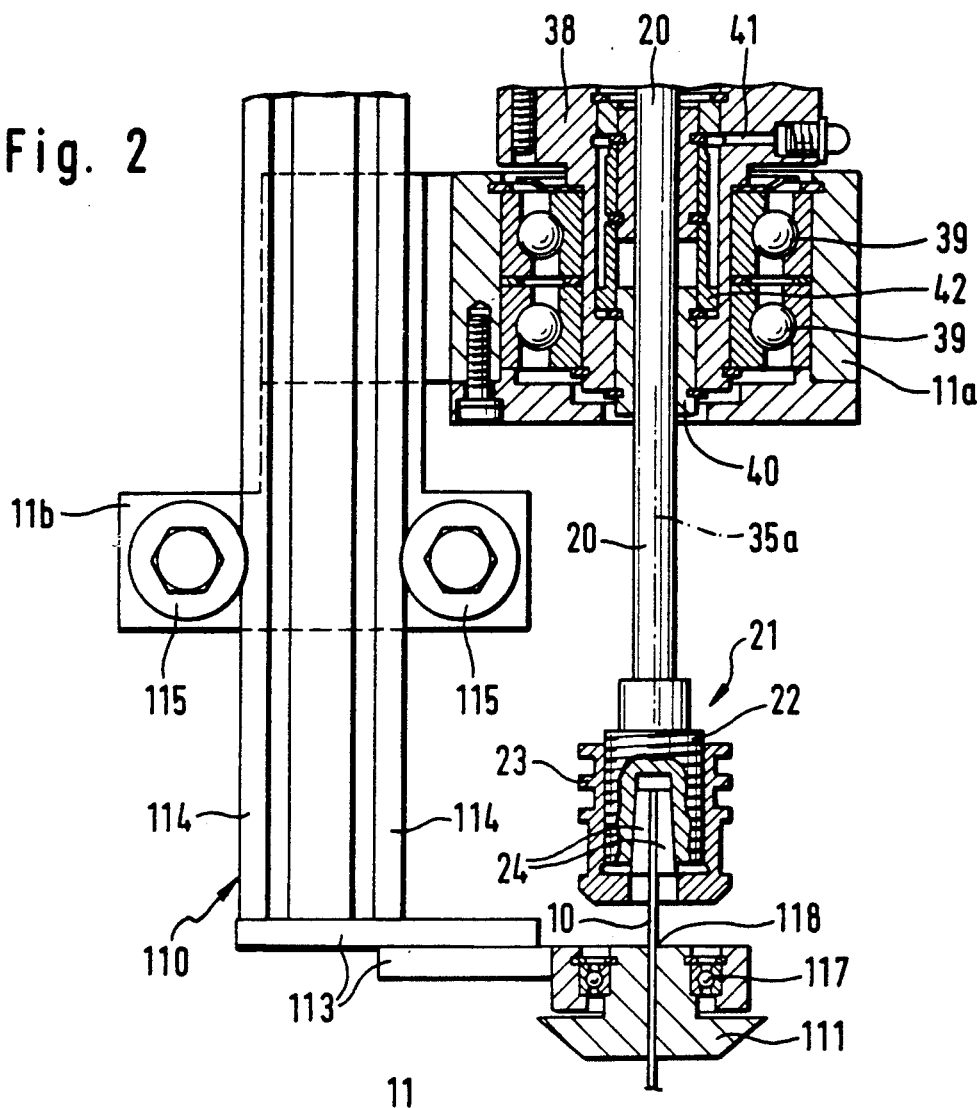
FIG. 2 is a view on an enlarged scale of a detail from FIG. 1, showing a clamping head with hold-down means.
Figure 3:
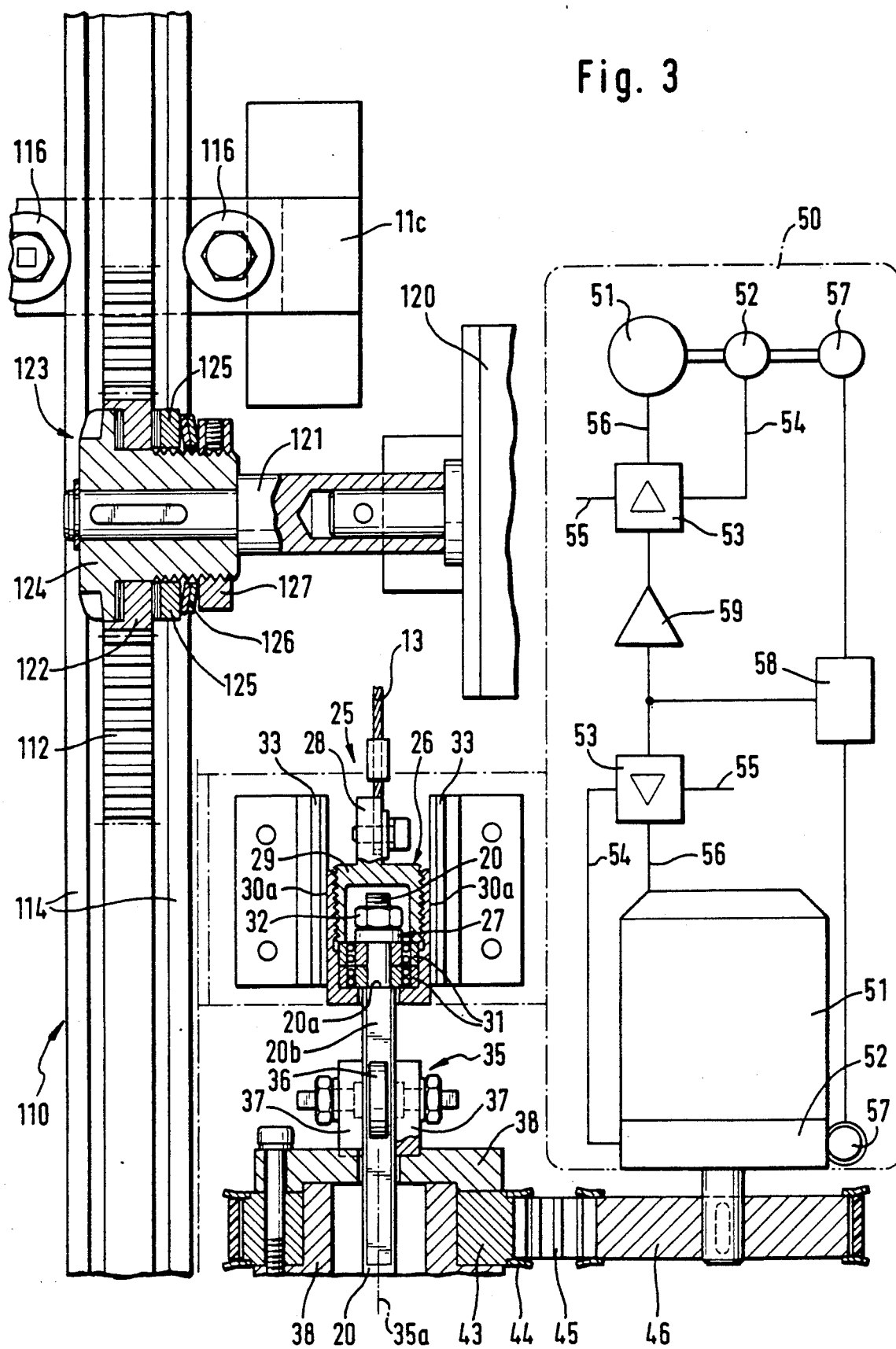
FIG. 3 shows a turning means for the clamping head and a displacement means for the hold-down means.

When using a finite band blade 10, the ends thereof are each gripped in a respective clamping head indicated at 21 in FIG. 2 which at its end has a respective drive rod 20. FIGS. 2 and 3 are to be combined together, with respective mutually aligned rod portions 20 in order to give the clamping means disposed in the tool carriage 11; a similar clamping means is also to be found in the lower tool carriage 12, although it will be appreciated that the clamping head thereof faces upwardly. Each clamping head 21 comprises first and second sleeve-like components 22 and 23 and clamping taper members 24 which can be displaced in the interior of the sleeve-like component 22 along corresponding taper surfaces and thus clamp fast the end of the blade 10 which is inserted therebetween. The sleeve-like component 22 has an external screwthread and the sleeve-like component 23 has an internal screwthread as well as drive projections for the taper members 24.

The other end of the respective drive rod 20 is secured to a rotary mounting arrangement indicated at 25 in FIG. 3, which provides the connection with the cable 13. The rotary mounting arrangement 25 essentially comprises two fixing components 26 and 27 which are rotatable relative to each other. The end of the cable 13 is formed into a loop which is secured in position by a fixing sleeve which is pressed thereon. The fixing component 26 has an extension 28 with a cable eye formed therein, into which the looped end of the cable can be inserted and secured in position by means of a screw and a cover plate.

Associated with the fixing component 26 is also a screw bush 30 for fixing between two annular shoulders the outer running surfaces of two ball bearing assemblies 31.

The fixing component 27 comprises a nut 32 at the end of the drive rod 20 co-operating with a shoulder 20a on the drive rod 20. The inner races of the ball bearing assemblies 31 are clamped between the shoulder 20a and the nut 32.

The fixing component 26 is prevented from rotating in order to prevent the cable 13 from being twisted. For that purpose at mutually oppositely disposed locations the bush 30 has respective flats as indicated at 30a in FIG. 3 and as also shown more clearly in FIG. 4, co-operating with first and second support members 33 to provide a guide effect. The support members 33 are secured to the respective tool carriage 11 or 12 and guide the rotary mounting arrangement 25 when it moves with a reciprocating movement relative to the respective tool carriage.

Figure 4:
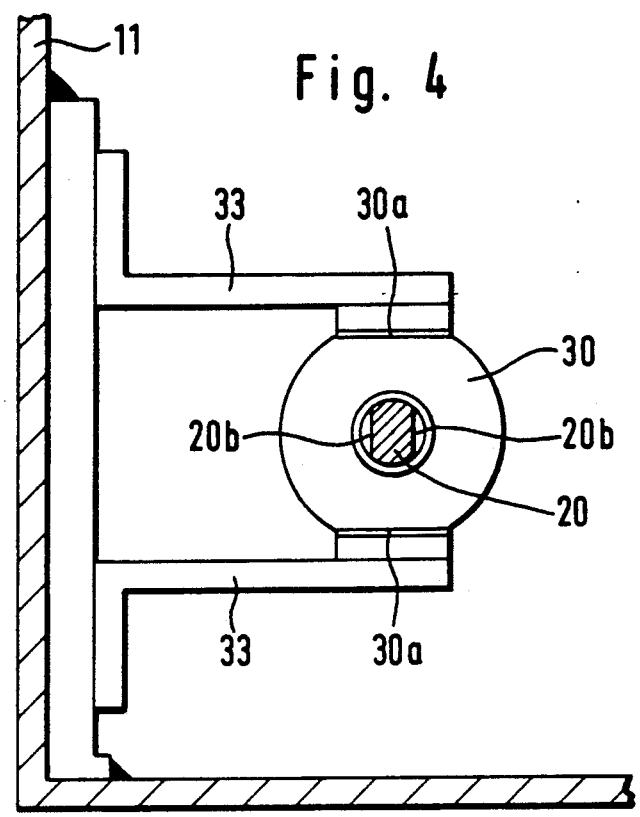
FIG. 4 is a view on an enlarged scale and in section of a detail from FIG. 3.

The drive rod 20 also has first and second flats as indicated at 20b in both FIGS. 3 and 4, which serve to apply a torque about the longitudinal axis of the drive rod 20 without impeding longitudinal displaceability thereof. To provide for transmission of the forces involved, the arrangement includes a turning device 35 having a pair of mutually oppositely disposed rollers 36 which run against the flats 20b. The flats 20b are preferably arranged parallel to each other and therewith also the axes of rotation of the rollers 36. The spindles on which the rollers 36 are supported are secured by means of support mountings 37 to a multi-part composite mounting carrier 38 of the turning device 35. The mounting carrier 38 is substantially in the form of a cylindrical housing and may have a telescopically extensible projection portion (not shown) which guides the blade 10 adjacent the workpiece 9. That arrangement thus carries the cutting pressure acting on the blade 10 and tending to produce a reverse turning movement thereof so that the amount of twisting of the blade, which involves a deviation from the correct angle of cut, remains at a low level.

The housing 38 of the turning device 35 is mounted rotatably but non-slidably by way of two ball bearing assemblies 39 (as shown more clearly in FIG. 2) in a support housing 11a of the respective tool carriage 11 or 12, and includes longitudinal bearing means 40 for example in the form of plain bearing shells or ball-type longitudinal guides for further guiding and longitudinally supporting the drive rod 20. The longitudinal bearing means 40 can be lubricated by way of a bore 41 and cages 42.

Provided at the outer periphery of the turning device 35, as shown in FIG. 3, is a toothed belt pulley 43 which is provided with lateral guides 44 and over which runs a tooth belt 45 which, by virtue of its positive engagement with the pulley is slip-free and which cooperates with a further toothed belt pulley 46 of a control motor 51. The drive rod 20 is driven in rotation by way of the pair of rollers 36 which bear in a prestressed condition against the flats 20a on the drive rod 20. In the neutral or zero position of the rotary drive arrangement, the clamping surfaces of the taper members 24 are disposed precisely vertically and the flats or guide surfaces 20b on the drive rod 20 are disposed in the main plane of the cutting unit carrier 6. The blade 10 cannot therefore be fitted in an inclined or twisted condition. In addition, in installing the blade, care is to be taken to ensure that the cutting edge indicated at 10a in for example FIG. 5 is disposed precisely on the axis of rotation 35a of the turning device, which can be checked by means of suitable radial markings on the sleeve 23, as shown in FIG. 5, and can be set by means of abutment pins.

The control motor 51 is part of a rotary control arrangement 50 which, for each turning device 35, also has an angular position detector 52 as well as a comparator 53 for effecting a comparison between an actual value and a reference value and for the output of a control command, as well as an actual value line 54, a reference value line 55 and a control command line 56. When the angular value of the turning device 35 differs from the reference value which can constantly change, the turning device 35 is turned so that the plane in which the cutting blade is disposed, as indicated at 10e in FIG. 5, is adjusted to meet the prevailing requirements.

As the machine of the invention has two turning devices 35 as described above, they must be coupled to provide for synchronous driving thereof, which in the illustrated embodiment is effected by way of what is known as an electrical shaft comprising components 57, 58 and 59. More specifically that arrangement includes two incremental travel or angular position detectors 57, a comparator 58 and an operational amplifier 59 whereby the positions of the two turning systems are compared together and, if there is a deviation therebetween, one system is adjusted to bring it into conformity with the other system. The turning devices 35 may also be driven by a common motor by way of two mechanical drive shafts.

If the workpieces 9 to be cut are thin foam plates, they would be lifted away from the workpiece table plate 3 when the blade 10 is moving upwardly. The machine of the invention therefore further includes a hold-down means 110 which is secured to the tool carriage 11 but which can be moved downwardly until a sliding shoe or skid 111 comes to bear against the workpiece 9. The sliding shoe 111 is adjustably fixed to the lower end of a toothed rack 112 by means of bridging portions 113 in order to be precisely aligned with respect to the axis 35a of the turning devices 35. The rack 112 extends in parallel relationship with the drive rod 20 and has guides 114 cooperating with pairs of rollers 115 (see FIG. 2) and 116 (see FIG. 3) which are carried on the respective holders 11b (see FIG. 2) and 11c (FIG. 3) which in turn are secured to the tool carriage 11. The bridging portions 113 have a rotary mounting arrangement 117 which serves for rotatably mounting the sliding shoe 111. The shoe 111 has a slot 118 through which the blade 10 is passed, the blade 10 thus turning the shoe 111 as appropriate. Instead of that passive drive, namely wherein the shoe 111 is turned by the blade 10 as it is turned by the turning devices 35, it would also be possible to provide an active drive arrangement for producing positive turning movement of the shoe 111. More specifically, if the mounting carrier 38 has the above-mentioned telescopically extensible projection portion, it is connected to the shoe 111 so that the shoe 111 is also actively turned by the turning device in order to support the blade 10 to resist the cutting pressure which tends to produce a reverse turning movement thereof, close to the region in which the blade cuts through the workpiece on the workpiece table plate 3.

For the purposes of driving the rack 112, the machine has a reversible motor 120 which is shown in FIG. 3, the output shaft 121 of which carries a gear 122 by way of an interposed friction clutch 123. The friction clutch 123 includes a bush 124 with an annular shoulder thereon, and a pressure ring 125, the bush 124 and the ring 125 being provided with friction linings at their respective sides towards the gear 122, together with diaphragm springs 126 and a nut 127 which is screwed on to a screwthread on the bush 124, in order to provide a support for the diaphragm springs 126. Thus, the gear 122 and therewith the rack 112 can be driven by suitable energisation of the reversible motor 120. Just before the shoe 111 comes to bear against the workpiece 9 on the table plate 3, the motor 120 is switched off, for example under visual control. When the shoe 111 is moved upwardly, it could strike against the clamping head 21; in order at any event to prevent damage from occurring due to such an event, the gear 122 can slip by virtue of the provision of the slipping clutch 123.

For the purposes of driving the blade 10 in the direction of the Z-axis (see FIG. 1), incorporated in the tool carriage 12 is an oscillating drive 60 which is shown in greater detail in FIG. 12. The drive 60 engages the cable 13 and moves it with an reciprocating motion of about 50 mm. The drive 60 includes a rocking arm 61 which is mounted pivotably to the tool carriage 12 by means of a mounting 62 while at its free end it has a clamping means 63 for clamping the cable 13. The arm 61 is connected by way of a connecting rod 64 to a crank 65 which is in the form of a flywheel and which can be driven in rotation by a motor (not shown). The end 66 of the connecting rod 64 which is connected to the crank 65 accordingly revolves with the crank 65 while the other end 67 of the connecting rod 64 reciprocates and thus drives the arm 61 which in turn entrains the cable 13 therewith and thus imparts an oscillating drive movement thereto.

The tool carriages 11 and 12 are driven in the direction of the Y-axis by means of a drive 70 which is shown in greater detail in FIG. 7 and which is disposed in the lower limb portion of the cutting unit carrier 6. The drive 70 drives a toothed belt 71 by way of a drive wheel 72. The belt 71 is passed around the drive wheel 72 and five further guide wheels 73 through 77. The spindles of the wheels 72 through 77 are mounted on the cutting unit carrier 6 and are arranged in such a way that the portion of the belt 71 which extends between the guide wheels 74, 75 and 76 extends parallel to the guide 7 while the portion of the belt extending between the wheels 77, 72 and 73 extends parallel to the guide 8. When the belt 71 is driven, those belt portions obviously move parallel to each other in the same direction and at the same speed. The belt 71 can therefore be fixed to the tool carriages 11 and 12 in order to drive same over the same distances and in the same direction, as indicated at 78 and 79 in FIG. 8. The tool carriages 11 and 12 are thus displaced in precisely vertically superposed relationship.

Figure 10:
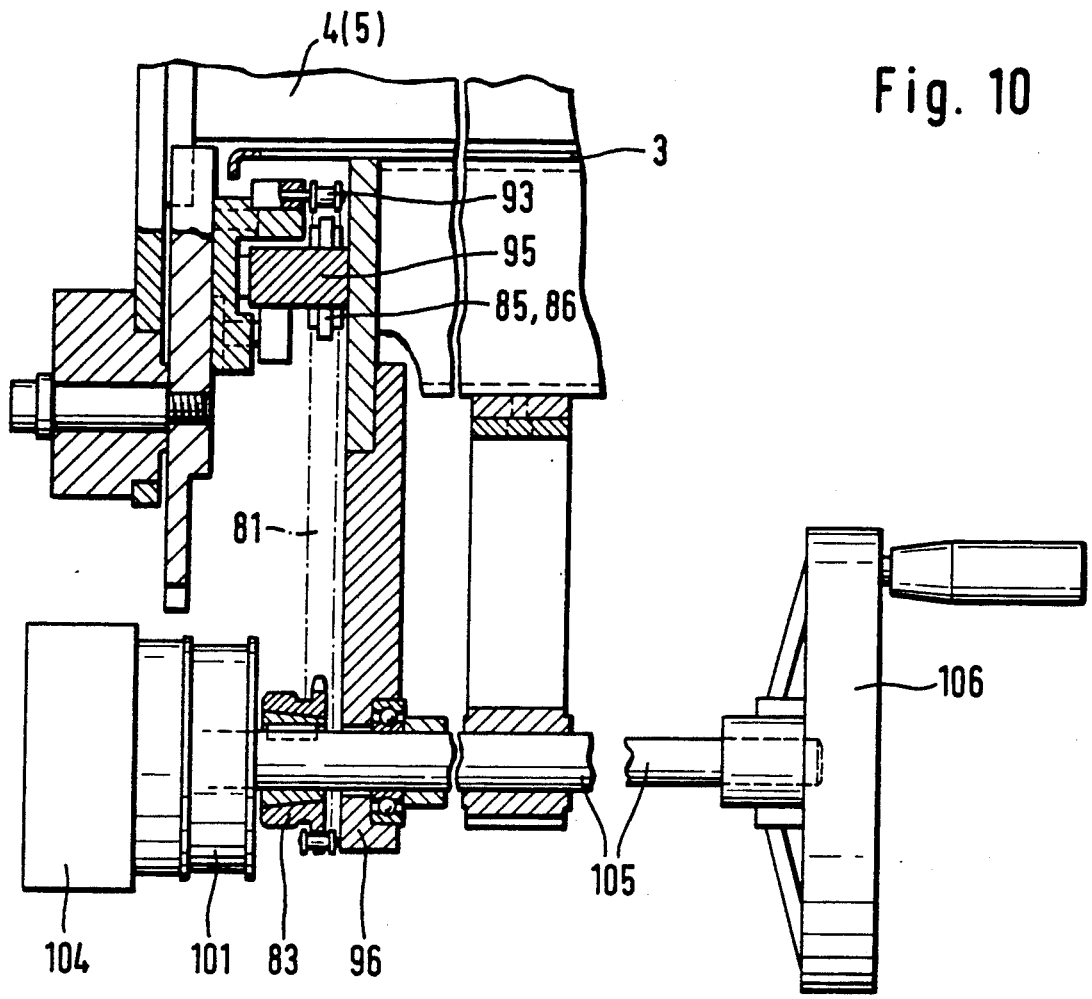
FIG. 10 shows a view on an enlarged scale of a detail of the drive of FIG. 9.

Referring now to FIG. 9, shown therein are the major parts of the drive 80 for producing movement in the directions of the X-axis. The drive 80 includes two endless chains 81 and 82 which are tensioned around chain wheels 83 through 87 and 88 through 92 respectively, with a run 93 and 94 respectively of each chain extending parallel to the support surface of the table plate. The runs 93 and 94 of the chains 81 and 82 are connected to one side of the sliders 4 and 5, the nature of the coupling being shown in FIGS. 10 and 11.

Thus, provided on the main portion 2 of the machine are guides 95 which are disposed for supporting and longitudinally guiding the sliders 4 and 5 at both sides of the table structure 96. The sliders 4 and 5 each have longitudinal bearer members 97 which each extend downwardly at the side portions of the table structure 96 and which extend around the guides 95. Also mounted on the longitudinal bearer members 97 are coupling means 98 which make the connection with the run 93 of the chain 81 and the run 94 of the chain 82 respectively.

Figure 11:
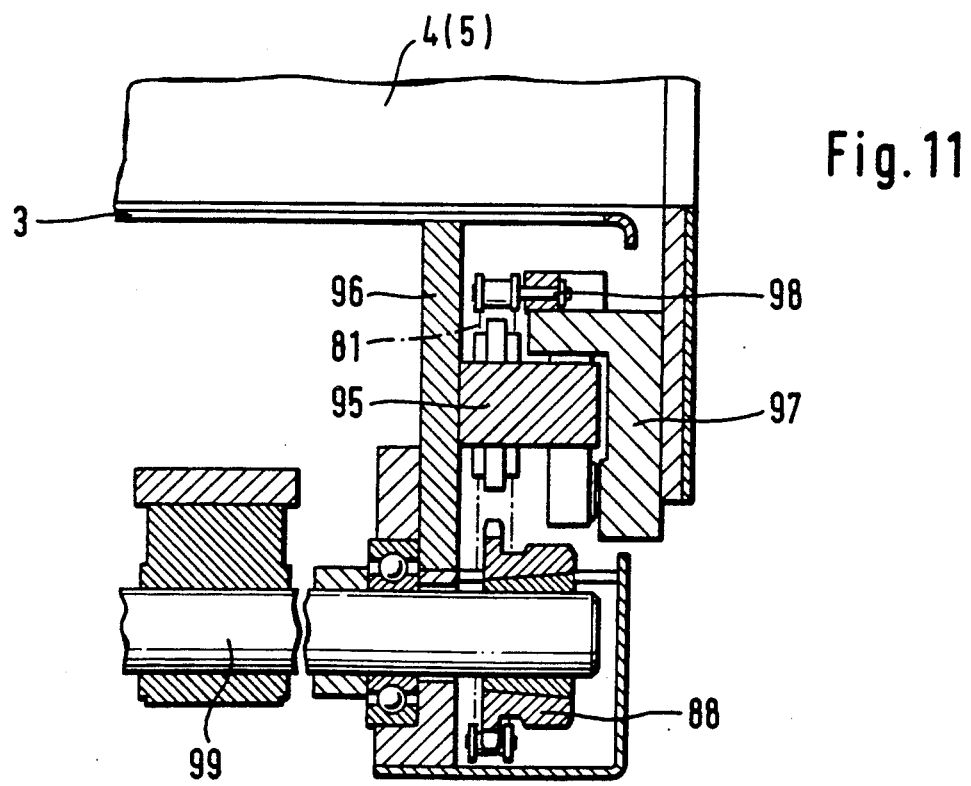
FIG. 11 is a view on an enlarged scale of a further detail of the machine.

As shown in FIG. 11, the chain wheel 88 has a shaft 99 which can be driven by the drive 80 by way of transmission means (not shown) so that the slider 5 can be driven by way of the chain 82 and by way of a coupling belt 100 shown in FIG. 9, the chain wheel 83 and therewith also the chain 81 and the slider 4 can be correspondingly driven.

The coupling belt 100 passes round pulleys 101, 102 and 103 of which the pulley 103 is intended for tensioning the belt 100. The pulley 102 is non-rotatably connected to the chain wheel 88. However, there is a releasable connection between the pulley 101 and the chain wheel 83 by virtue of the provision of an electromagnetically operated tooth coupling 104 which either makes or disengages the connection between the pulley 101 and the shaft 105. Disposed at the end of the shaft 105 remote from the coupling 104 is a hand wheel 106 with which the chain 81 and therewith the slider 4 alone can be displaced, when the coupling 104 is disengaged, for the purposes of clamping the workpiece 9 between the sliders 4 and 5. When the coupling 104 is engaged the chains 81 and 82 are then driven jointly by way of the motor of the drive 80 for producing movement in the direction of the X-axis.

It will be appreciated that the longitudinal movement of the sliders 4 and 5 can also be produced in another fashion, for example by means of toothed rods or drive spindles, as indicated for the sake of simplicity in FIG. 1. In such a case also it is possible to provide a disengageable drive connection in order to be able to drive only the one slider 4 or 5 when the distance between the slides 4 and 5 is to be adjusted.

Operation of the machine is as follows:

The workpiece 9 which may be for example a foam block or layers of foam material which are cut up horizontally is put on to the divided table plate 3 and the sliders 4 and 5 are moved towards the edge of the foam block so that the foam block is thereby clamped between them. The drive 60 for producing movement of the blade 10 in the direction of the Z-axis is brought into operation. The tool carriages 11 and 12 which are in the starting position shown in FIG. 7 are then moved towards the workpiece 9, with the blade 10 then passing into the slot 3a and finally cutting into the workpiece 9. The drive 70 and the drive 80 for producing movements in the directions of the Y-axis and the X-axis respectively are operated so that the blade 10 moves along the required curve in the XY-plane. At the same time the corresponding control voltages $U_x$ and $U_y$ are passed to the controlmeans 50 which from the quotient of those values determines the tangent of the turning angle $\alpha$ and provides for actuation of the control motor 50 for adjustment purposes in the event of the actual value deviating from the reference value. In that way the cutting edge 10a of the blade 10 is always turned so that it is in the correct cutting direction. That guarantees that the cut is of the correct configuration.

The cutting blade 10 is made narrow in width so that the slot 3a in the table plate 3 can also be narrow. The slot 118 in the shoe 111 can in any case be very narrow. If the blade 10 oscillates and tends to entrain the adjoining foam material of the workpiece 9 therewith, that is prevented by means of wall portions adjacent the slots 3a and 118 respectively, that is to say the blade can only move relative to and cut the foam material.

If the machine is used with a running-around cutting blade, it is preferably driven in such a way that the cutting pressure urges the foam material towards the shoe 111 while the table plate 3 is relieved of load in the region of the slot 3a, in which case there is no tendency for pieces of foam material to become jammed in the slot 3a.

It will be appreciated that the above-described construction has been set forth solely by way and illustration of the principles of the present invention and that various modifications and alternations may be made therein without thereby departing from the spirit and scope of the invention.

What is claimed is:

1. A machine for cutting contours in workpieces comprising first and second machine main sections wherein said first main section includes:
   (a) a cutting unit carrier having first upper and second lower guide means arranged in parallel superposed relationship,
   (b) upper and lower tool carriages of which said upper tool carriage is guided longitudinally of said upper guide means and said lower tool carriage is guided longitudinally of said lower guide means,
   (c) means for driving said upper and lower tool carriages in the same direction and by the same distances,
   (d) a narrow band blade having a longitudinal extension and adapted to extend in a tensioned condition between said upper and lower tool carriages and defining a cutting plane,
   (e) means for actuating said blade in the direction of said longitudinal extension, and
   (f) a turning means for said blade comprising first and second turning devices disposed in respective ones of said upper and lower tool carriages and adapted to turn said cutting plane of said blade in accordance with said contour to be cut in said workpiece, and wherein said second machine main section includes:
   (g) a table structure having a divided table plate to provide a support surface for said workpiece to be cut, said table plate having a narrow gap therein for said blade to pass therethrough, and
   (h) first and second sliders adapted to be moved towards each other for clamping said workpiece therebetween on said table plate and adapted to be moved jointly with each other on said table plate for moving said workpiece relative to said band blade and thereby cutting said contours.

2. A machine as set forth in claim 1 wherein said upper tool carriage further comprises a workpiece holding-down means having a slot for said blade to pass therethrough and adapted to bear downwardly against said workpiece on said table to carry an upwardly directed cutting force.

3. A machine as set forth in claim 1 wherein said band blade has two ends, said upper and lower tool carriages each comprises a respective gripping head each for gripping an end of said blade, and wherein the blade actuating means comprises an oscillating driving means.

4. A machine as set forth in claim 1 wherein said cutting unit carrier comprises first and second limb portions in superposed relationship, one limb portion extending beneath said gap in said table plate and the other limb portion being disposed at a spacing above said table plate which slightly exceeds the maximum height of a workpiece to be cut.

5. A machine as set forth in claim 1 and further including a circulating flexible drive member which is disposed in said cutting unit carrier, and guide means for guiding said drive member to define runs thereof which extend longitudinally of said respective upper and lower guide means and which are adapted to be displaced in the same direction as each other, and therein said respective tool carriages are operatively connected to respective ones of said runs of said drive member which are adapted to move in the same direction.

6. A machine as set forth in claim 5 wherein said drive member is a toothed belt passing around six belt wheels, first, second and third ones of said belt wheels being disposed in operative association with said upper guide means and fourth, fifth and sixth ones of said belt wheels being disposed in operative association with said lower guide means.

7. A machine as set forth in claim 1 including means for tensioning said blade comprising a flexible tensioning member operatively connected to said blade, and pulleys comprising a first pulley operatively connected to said upper tool carriage for movement therewith, second and third pulleys operatively connected to said lower tool carriage for movement therewith, fourth and fifth pulleys disposed in operative association with said lower guide means and a sixth pulley disposed in operative association with said upper guide means, the arrangement of said pulleys being such that said flexible tensioning member extends around said third, fourth and fifth pulleys to define a loop disposed in operative association with said lower guide means, and around said first and sixth pulleys to define a run disposed in operative association with said upper guide means whereby said loop increases and decreases in length with movement of said tool carriages to the same extent as said run associated with said upper guide means increases and decreases in length.

8. A machine as set forth in claim 1 and further including drive means for moving said first and second sliders, said drive means providing drive runs extending transversely with respect to said gap in said table plate, wherein at least one of said sliders is adapted to be uncoupled from said respective said drive run.

9. A machine as set forth in claim 8 wherein a respective drive run of said drive means is disposed on each side of said gap in the table plate and further including a control means operative to connect and disconnect said drive runs relative to each other.

10. A machine as set forth in claim 9 and further including a hand wheel operatively connected to one of said drive runs for clamping and releasing said workpiece when said drive runs are in the mutually disconnected condition thereof.

11. A contour cutting machine including:
a body structure comprising a C-shaped frame disposed substantially vertically and having upper and lower limb portions, and
a table means extending substantially horizontally,
upper guide means extending along said upper limb portion and lower guide means extending along said lower limb portion,
an upper tool carriage guided on said upper guide means and a lower tool carriage guided on said lower guide means,
means for displacing the upper and lower tool carriages in the same direction and over the same distances synchronously with each other,
means carried on said upper and lower carriages for stretching a narrow band blade between said upper and lower limb portions,
means for actuating the band blade for cutting operation thereof,
a turning means for turning the blade about its axis, comprising first and second turning devices disposed at respective ones of the upper and lower tool carriages, operable to turn the cutting plane of the blade in accordance with the cutting operation to be performed thereby,
said table means providing a support surface for supporting a workpiece thereon, and having a gap for the blade to pass therethrough,
first and second sliders which are operatively associated with said table means for clamping a workpiece therebetween on said table means, and
means for displacing said first and second sliders relative to each other for clamping and releasing a said workpiece therebetween and for moving said first and second sliders jointly with each other during the cutting operation.

* * * * *